2,837,512
ACTIVATED CELLULOSE ETHERS AND PROCESS OF PREPARING SAME

Gerald J. Mantell, Newark, Del., assignor to E. I. du Pont de Nemours and Company, Wilmington, Del., a corporation of Delaware No Drawing. Application November 3, 1954
Serial No. 466,699

6 Claims. (Cl. 260—231)

This invention relates to a new class of cellulose ethers and more particularly to cellulose ethers containing an activated carbon to carbon double bond and to a process for the preparation of these cellulose ethers.

The formation of durable finishes on cellulose fabrics has been the object of many investigations. These durable finishes should be permanent as well as rendering the cellulosic fabric resistant to flame, water, wrinkling and shrinking. These finishes must be capable of being applied without detrimental changes in other fabric properties such as tensile strength, crispness, abrasion resistance and hand.

This invention has as an object to provide a new class of cellulose ethers containing an activated carbon to carbon double bond. A further object is to provide cellulose ethers which may be reacted with finishing agents so as to provide a resistant, durable finish to cellulosic fabrics. A still further object is to provide a process for the preparation of these cellulose ethers containing an activated carbon to carbon double bond. Other objects will appear hereinafter.

These and other objects are accomplished by the following invention of cellulose ethers of the type

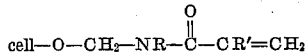

wherein R is a radical selected from the group consisting of hydrogen and lower alkyl radicals and R' is a radical selected from the group consisting of hydrogen and methyl radicals and wherein the degree of substitution is between about 0.015 to 0.60. These cellulose ethers can be conveniently prepared by the reaction of cellulose with an unsaturated amide having the general formula

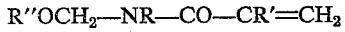

wherein R is a radical selected from the group consisting of hydrogen and lower alkyl radicals; R' is a radical selected from the group consisting of hydrogen and methyl radicals and R" is a radical selected from the group consisting of hydrogen and lower alkyl radicals, in the presence of an acid or acid-generating catalyst.

The term degree of substitution is used to denote the number of substituents per anhydro glucose unit. Since each unit contains three hydroxyl groups, the maximum degree of substitution would accordingly be three. A degree of substitution between about 0.015 to 0.60 corresponds to a percentage substitution of hydroxyl groups of from 0.5% to 20%.

The following examples will better illustrate the nature of the present invention; however, it is to be understood that the invention is not intended to be limited to these examples.

Example I

Acrylamide (284.4 g., 4 mols) was slurried with sodium nitrite (0.8 g., a polymerization inhibitor) in ethyl acetate (800 cc.). The mixture was made alkaline to phenolphthalein test paper with 25% alcoholic potassium hydroxide, and paraformaldehyde was added quickly at room temperature (124 g., 4.1 mols). The alkalinity was readjusted as before and the temperature was raised to 50° C. After 2½ hours, more alkali was added to a pink color on phenolphthalein paper, and the solution was allowed to remain at room temperature overnight. The cloudy solution was warmed, filtered and concentrated to 60% of its volume by distillation of part of the ethyl acetate. Cooling in ice water yielded well defined crystals of N-methylolacrylamide (245.5 g., 60.7% yield, melting range 76–77.5° C.). Further concentration of the mother liquor afforded additional product as two crystalline fractions of about the same melting points (total 103 g., 25.5% yield, 67–74° C.). Recrystallization from ethyl acetate (approximately 2 cc./gm.) gave a pure compound, melting point 77.5–78.5° C.

Calcd. for $C_4H_7O_2N$: C, 47.5; H, 6.92; N, 13.9. Found: C, 47.7, 48.0; H, 7.36, 6.74; N, 13.9, 13.9.

Example II

The reaction between cellulose and N-methylol-acrylamide was conducted in the following way. A rayon challis (made of regenerated cellulose) fabric was immersed at room temperature in an aqueous pad bath solution which contained dissolved in it approximately 0.7% of ammonium chloride (acid catalyst) and the methylol compound in a concentration of 30.6%. After padding and squeezing to remove excess solution, the wet pick-up was about 154%. The fabric was air dried, cured for about 10 minutes at 150° C., washed with water and then in an aqueous solution containing 0.2% each of soap and soda ash, dried at 110° C. for an hour and weighed in a closed dish to determine the weight gain.

The yield of acrylamidomethyl cellulose, determined from the wet pick-up of pad solution and the weight gain of 23.7% is about 60% (based on the weight of N-methylolacrylamide used). This corresponds to a degree of substitution of 0.46.

When this run was repeated with pad bath concentrations of 25.0% and 14.7%, and wet pick-ups were 150% and 147%, respectively, the degrees of substitution were 0.32 and 0.19, respectively.

Example III

N-methylolmethacrylamide was prepared from methacrylamide and para-formaldehyde according to the procedure outlined in Example I. Its melting point was 55.5–56.0° C. after crystallization from cold ether.

Calcd. for $C_5H_9O_2N$: C, 52.2; H, 7.8; N, 12.2. Found: C, 51.5, 51.5; H, 7.7, 8.0; N, 11.8, 11.9.

This compound was made to react with cellulose in the presence of tartaric acid catalyst as described in Example II. From 9.8% and 20% pad baths and at wet pick-ups of 125% and 129%, the degrees of substitution were 0.11 and 0.25, respectively.

Example IV

N-methylol-N-methylacrylamide was prepared from N-methylacrylamide according to the procedure described with acrylamide in Example I. Crystallization could not be induced and the sample utilized for reaction with cellulose was the crude material. This compound was applied to rayon challis from a 15% aqueous pad bath with ammonium chloride, as described in Example II, producing N-methylacrylamido methyl cellulose ether (wet pick-up 125%, degree of substitution 0.029).

The cellulose ethers containing an activated carbon to carbon double bond of the present invention are useful as intermediates to the preparation of cellulose derivatives which contain a durable, permanent finish on the cellulosic fabrics making them resistant to flame, water, wrinkling and shrinking. These cellulose derivatives are prepared by reacting the cellulose ethers of the present invention with active hydrogen compound finishing agents, such as amines, mercaptans and dialkyphosphites. The resulting cellulose derivatives and the process for their preparation are more particularly disclosed in my copending U. S. application Serial No. 46,694, filed of even date herewith and assigned to the assignee of the present application.

The degree of substitution, i. e., the number of substituents per anhydro glucose unit, should be between about 0.015 and 0.6. Substitution lower than 0.015 is insufficient to change the properties of the cellulose significantly and the nitrogen content becomes almost undetectable, while substitution above 0.6 is usually impractical due to cost of reagents and undesired changes in the properties of the cellulose, such as tensile strength. The degree of substitution can be controlled by the concentration of amide in the pad bath, and by the wet pick-up. The latter is a function partly of the nature of the fabric, and partly the degree of drying by the squeeze rolls.

While the invention has been illustrated by the use of a rayon challis fabric (made of regenerated cellulose), it is to be understood that other forms of cellulose, such as cotton fibers, threads or woven fabric may be used.

While the temperature at which the reaction between the cellulose and the amide is carried out is not critical, it is generally desirable to conduct the reaction at a temperature of about 140 to 175° C. At a temperature in this range the desired degree of condensation occurs in about 2 to 10 minutes.

The reaction is to be carried out in the presence of an acid or acid-generating catalyst in order to effect the desired condensation. An acid-generating catalyst is one which is substantially neutral or slightly alkaline in solution and which generates acid strong enough to affect the condensation here involved. Operable catalysts include citric acid, tartaric acid, ammonium chloride, ammonium thiocyanate, diammonium acid phosphate, zinc chloride, ammonium tartrate, ammonium nitrate, ammonium sulfates and phosphates and ammonium formate.

As many apparently widely different embodiments of this invention may be made without departing from the spirit and scope thereof, it is to be understood that this invention is not limited to the specific embodiments thereof except as defined in the appended claims.

What is claimed is:
1. A cellulose ether of the general type

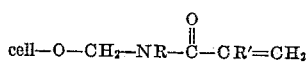

wherein R is a radical selected from the group consisting of hydrogen and lower alkyl radicals of from 1 to 4 carbon atoms and R' is a radical selected from the group consisting of hydrogen and methyl radicals and wherein the degree of substitution is between about 0.015 to 0.60.

2. A cellulose ether of the type

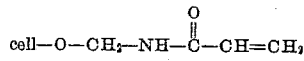

wherein the degree of substitution is between about 0.015 to 0.60.

3. A cellulose ether of the type

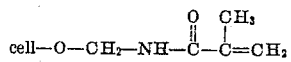

wherein the degree of substitution is between about 0.015 to 0.60.

4. A process for the preparation of cellulose ethers which comprises reacting cellulose with an amide having the general formula

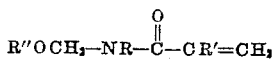

wherein R is a radical selected from the group consisting of hydrogen and lower alkyl radicals; R' is a radical selected from the group consisting of hydrogen and methyl radicals; R" is a radical selected from the group consisting of hydrogen and lower alkyl radicals in the presence of a catalyst strong enough to effect the condensation, said catalyst being selected from the group consisting of acid and acid-generating catalysts at a temperature of about 140° to 175° C.

5. A process for the preparation of a cellulose ether which comprises reacting cellulose with N-methylolacrylamide in the presence of ammonium chloride at a temperature of about 140° to 175° C.

6. A process for the preparation of a cellulose ether which comprises reacting cellulose with N-methylolmethacrylamide in the presence of tartaric acid at a temperature of about 140° to 175° C.

References Cited in the file of this patent
UNITED STATES PATENTS

| | | |
|---|---|---|
| 2,317,756 | Graenacher et al. | Apr. 27, 1943 |
| 2,399,603 | Rust et al. | Apr. 30, 1946 |

FOREIGN PATENTS

| | | |
|---|---|---|
| 674,642 | Great Britain | June 11, 1952 |

OTHER REFERENCES

"The catalytic preparation and interconversion of simple and mixed ethers," by Ipatieff et al., J. A. C. S., vol. 63 (1941), pp. 969 to 971.